UNITED STATES PATENT OFFICE.

NOAH WRINKLE AND WALTER A. KUHNERT, OF SAN FRANCISCO, CALIFORNIA.

METHOD OF SEPARATELY OBTAINING POTASSIUM CHLORID AND BORAX FROM CERTAIN WATERS.

1,350,089.     Specification of Letters Patent.     Patented Aug. 17, 1920.

No Drawing. Original application filed May 22, 1919, Serial No. 299,042. Divided and this application filed July 14, 1919. Serial No. 310,730.

*To all whom it may concern:*

Be it known that we, NOAH WRINKLE and WALTER A. KUHNERT, citizens of the United States, and residents of San Francisco, in the county of San Francisco and State of California, have invented new and useful Improvements in Methods of Separately Obtaining Potassium Chlorid and Borax from Certain Waters, of which the following is a specification.

The present application is a division of an application, Ser. No. 299,042, filed May 22, 1919, and relates to improvements in methods of obtaining potassium chlorid and borax from certain waters which contain potassium chlorid and borax and other salts. Such waters comprise inland lakes, solutions formed by dissolving in water the salts deposited on the bottoms of dry lakes, and solutions formed by dissolving in water salts obtained by evaporation of waters of such inland lakes.

Waters to which it is intended to apply our improved process, may, and many do, contain such minerals as sodium carbonate, sodium bi-carbonate, sodium sulfate, sodium chlorid, sodium borate, potassium chlorid, and other minerals. Among such waters is that from Searles lake in California, of which the following is the composition:—

| | |
|---|---|
| $Na_2CO_3$ | 4.10% |
| $Na_2SO_4$ | 6.60 |
| NaCl | 7.20 |
| KCl | 4.00 |
| $Na_2B_4O_7$ | 1.03 |
| Water | 77.07 |

Also that from Owens lake in California, of which the following is the composition:—

| | |
|---|---|
| $Na_2CO_3$ | 8.50% |
| $Na_2SO_4$ | 3.02 |
| NaCl | 9.06 |
| KCl | 6.00 |
| $Na_2B_4O_7$ | 3.60 |
| Water | 69.92 |

Either with or without the preliminary removal of sodium bicarbonate by treatment of the solution with carbon dioxid, the solution is concentrated by evaporation and thereby the proportion of potassium chlorid and borax therein is increased and at the same time some of the more insoluble salts may be eliminated; or there may be obtained a mixture of crude salts by permitting the solution to cool with the deposition of crystals of potassium chlorid, borax and other salts. In this manner there has been obtained from the waters of Searles lake the following composition:—

| | |
|---|---|
| $Na_2CO_3$ | 1.70% |
| $Na_2SO_4$ | 0.44 |
| NaCl | 10.93 |
| KCl | 66.34 |
| $Na_2B_4O_7$ | 10.91 |
| Water | 9.66 |

Our method of treatment is as follows:—

Having a solution preferably saturated, at atmospheric temperature, with borax and sodium chlorid, and also containing potassium chlorid, sodium carbonate and sodium sulfate, we add to the solution being treated the required amount of sodium hydrate, either in liquid or solid form to convert the comparatively insoluble sodium bi-borate into the extremely soluble sodium meta-borate, in accordance with the following formula:—

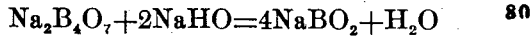

The solution, which may contain more or less free sodium hydrate in addition to that in combination with the meta-borate and which still contains all the other original salts, is now evaporated by being subjected to the action of heat. During evaporation sodium carbonate, sodium sulfate and sodium chlorid are crystallized and removed from the solution and finally the solution is permitted to cool and deposit crystals of potassium chlorid. The mother liquor, retaining the excess of sodium hydrate that may be added and all the sodium meta-borate is removed from the crystals of potassium chlorid. The mother liquor is then treated with carbon dioxid, obtained from a lime kiln, or other suitable source. This treatment results in the conversion of the sodium meta-borate to sodium bi-borate, insoluble in the solution, in accordance with the following formula:—

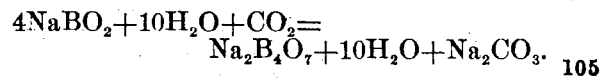

After removal of the borax the mother liquor is returned to the other liquors being similarly treated or utilized to effect recovery therefrom of sodium carbonate.

We claim:—

In a process of obtaining separately potassium chlorid and borax from certain waters containing sodium bi-borate and potassium chlorid, adding a sufficient quantity of sodium hydrate to the solution to produce within the solution a borate compound of increased solubility.

NOAH WRINKLE.
W. A. KUHNERT.